(12) United States Patent
Nunokawa

(10) Patent No.: US 6,799,824 B2
(45) Date of Patent: Oct. 5, 2004

(54) PRINTING WITH VARIABLE DOT-RECORDING RATE IN RESPONSE TO DOT SIZE ERROR

(75) Inventor: Hirokazu Nunokawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/406,567

(22) Filed: Apr. 4, 2003

(65) Prior Publication Data

US 2004/0017415 A1 Jan. 29, 2004

(30) Foreign Application Priority Data

Apr. 5, 2002 (JP) ........................................ 2002-103915

(51) Int. Cl.⁷ ........................... B41J 2/205; B41J 29/393
(52) U.S. Cl. .......................................... 347/15; 347/19
(58) Field of Search .............................. 347/49, 19, 15, 347/43

(56) References Cited

U.S. PATENT DOCUMENTS 6,003,970 A * 12/1999 Fujita et al. .................. 347/41
6,543,870 B1 * 4/2003 Kakutani ..................... 347/15

FOREIGN PATENT DOCUMENTS

JP 2001-121687 5/2001

* cited by examiner

Primary Examiner—Thinh Nguyen
(74) Attorney, Agent, or Firm—Sughrue Mion, PLLC

(57) ABSTRACT

A printing device capable of forming a plurality of types of dots having different sizes in a pixel area by selective ejection of any of the types of ink drops onto a print medium. A dot generator generates dot data representing the dot formation of each pixel in a printed image and a dot recorder ejects the different types of ink drops in response to the dot data. The printing device of the present invention further includes an error information receiver which receives error information representing error in ink quantity of at least one specific type of ink drop, and adjusts the dot recording rate formed by the specific type of ink drops depending on this error information.

22 Claims, 13 Drawing Sheets

TM

| 1 | 9 | 3 | 11 |
|---|---|---|----|
| 13 | 5 | 15 | 7 |
| 4 | 12 | 2 | 10 |
| 16 | 8 | 14 | 6 |

UM

| 16 | 8 | 14 | 6 |
|----|---|----|---|
| 4 | 12 | 2 | 10 |
| 13 | 5 | 15 | 7 |
| 1 | 9 | 3 | 11 |

Banding produced with #5 nozzle due to its upward shift
Fig.11A    Dot Recording Rate (Small 100%)
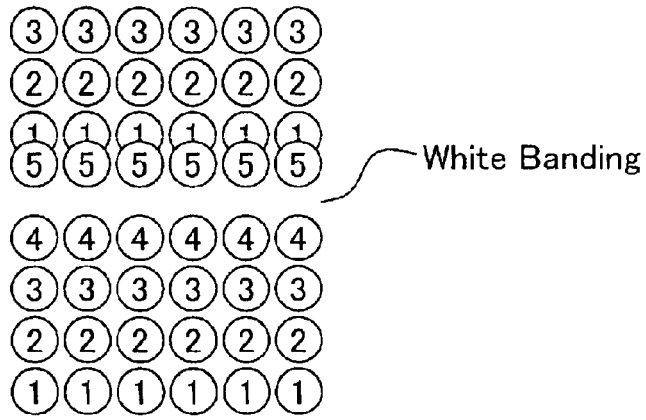
Fig.11B    Dot Recording Rate (Small 40%)
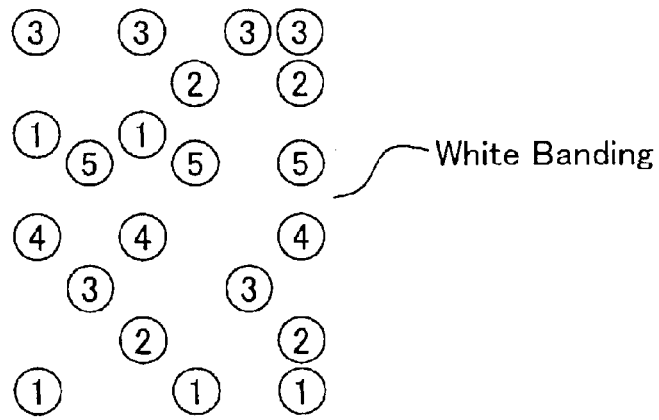
Fig.11C    Dot Recording Rate (Small 30%, Medium 5%)
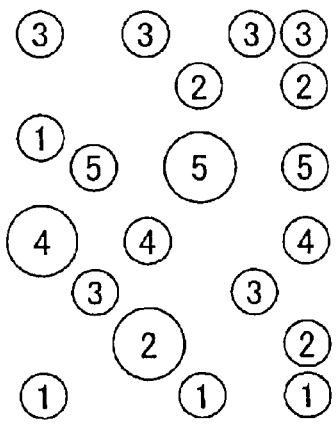

The First Embodiment

Relationship between Error Information of Small dots and Dot Recording Rate Tables

| Error Information of Small Dots | Dot Recording Rate Tables |
|---|---|
| Lager than 0.1 | DT1 |
| -0.1 to 0.1 | DTn |
| Smaller than -0.1 | DT2 |

Relationship between Error Information of Small Dots and Dot Profile

| Error Information of Small Dots | Upper Limit Value of Small Dot Recording Rate | Small Dot | Medium Dot | Large Dot |
|---|---|---|---|---|
| Lager than 0.1 | Equal or Less than 30% (L1) | SD1 | MD1 | LDn |
| -0.1 to 0.1 | Equal or Less than 25% | SDn | MDn | LDn |
| Smaller than -0.1 | Equal or Less than 20% (L2) | SD2 | MD2 | LDn |

The Second Embodiment

Relationship between Error Information of Small Dots and Dot Profile

| Error Information of Small Dots | Upper Limit Value of Small Dot Recording Rate | Small Dot | Medium Dot | Large Dot |
|---|---|---|---|---|
| Lager than 0.1 | Equal or Less than 30% (L1) | SD3 | MD3 | LDn |
| −0.1 to 0.1 | Equal or Less than 25% | SDn | MDn | LDn |
| Smaller than −0.1 | Equal or Less than 20% (L2) | SD4 | MD4 | LDn |

PRINTING WITH VARIABLE DOT-RECORDING RATE IN RESPONSE TO DOT SIZE ERROR

BACKGROUND OF THE INVENTION

1. Field of the Invention

This invention relates to a technique for printing an image on a print medium by ejecting ink thereon.

2. Description of the Related Art

In recent years, color printers of a type wherein inks of several colors are ejected from a print head have come to enjoy widespread use as computer output devices, and are widely used for multi-color, multi-level printing of computer-processed images. Such tone representation is performed by a method in which one of several types of dots of different sizes is selectively formed in a one-pixel area of a print medium.

With such a tone representation method, each tone value is represented by recording dots of each size at each appropriate recording rate. This dot recording rate is preset to an optimal value so as to minimize graininess (deviation of image) and banding (band-like image degradation).

However, where error is present in ink ejection quantity, error occurs in dots of each size. Where error occurs in dots of each size, there occurs the problem of dot recording rate, which is preset on the presumption of each dot size, no longer being the optimal value.

SUMMARY OF THE INVENTION

Accordingly, an object of the present invention is to reduce graininess and banding due to ink ejection quantity error.

In order to attain the above and the other objects of the present invention, there is provided a printing apparatus capable of forming one of N types of dots having different sizes at one pixel area by a selective ejection of any of the N types of ink drops onto a print medium. The N types of ink drops are different in an ink amount. N is an integer of at least 2. The apparatus comprises an error information receiver, a dot data generator, and a dot recorder. The error information receiver is configured to receive error information indicative of an ink amount error of at least one specific type of ink drop among the N types of ink drops. The dot data generator is configured to process input image data for generating dot data representing a state of dot formation at each pixel in a printed image. The dot recorder is configured to eject the N types of ink drops onto the print medium in response to the dot data. The dot data generator is configured to generate the dot data whose specific dot recording rate is adjusted in response to the error information. The specific dot recording rate is a rate of dot recorded with the specific type of ink drops.

According to the printing device of the present invention, the recording rate of at least one type of dot among a plurality of types of dots is adjusted in response to error information, whereby the occurrence of graininess and banding due to ink ejection quantity error can be reduced.

In a preferred embodiment of the invention, the specific type of ink drop is an ink drop to record a relatively small dot among the N types of ink dots, and the dot data generator is configured to generate the dot data whose upper limit of the specific dot recording rate is modified.

The maximum value for recording rate of relatively small dots among several types of dots has a relatively large effect on occurrence of banding, and therefore by modifying the upper limit value for recording rate of such dots, graininess and banding can be effectively held in check.

In a preferred embodiment of the invention, the dot data generator is configured to raise the upper limit of the specific dot recording rate when the error information shows increase of the ink amount by the ink amount error.

If ink drops of relatively small dots become large, there is a tendency for banding to become difficult to occur even if the recording rate of those dots is increased, and therefore the upper limit of recording rate of such dots can be increased and the recording rate of relatively large dots that are readily visible can be decreased. As a result, occurrence of banding can be held in check while minimizing graininess, and print quality can be improved.

In a preferred embodiment of the invention, the dot data generator is configured to lower the upper limit of the specific dot recording rate when the error information indicates decrease of the ink amount by the ink amount error.

If ink drops of relatively small dots become small, there is a tendency for banding to easily occur by means of recording of such dots. However, in such instances as well, by adopting the arrangement described above, the upper limit for recording rate of such dots can be reduced and the occurrence of banding held in check.

In another embodiment, the specific type of ink drop has a lowest ink amount among the N types of ink drops.

In a preferred embodiment of the invention, the dot data generator comprises a dot recording rate table storage and a dot recording rate table selector. The dot recording rate table storage is configured to storage a plurality of dot recording rate tables for determination of the N types of ink dots. The dot recording rate table selector is configured to select one of the plurality of dot recording rate tables in response to the error information. The plurality of dot recording rate tables includes a specific table to be selected in response to the error information.

By so doing, dot recording rate can be adjusted simply by selecting a dot recording rate table depending on error information, and therefore the burden of processing associated with implementation of the present invention is minimal. Further, the present invention can be implemented without modifying the method of the halftone process or other decrease process, so the present invention can be implemented easily.

In a preferred embodiment of the invention, the dot data generator is configured to generate the dot data compensated for the ink amount error of the specific type of ink drop in response to the error information.

In a preferred embodiment of the invention, the specific dot recording rate table is further adjusted to compensate for the ink amount error of the specific type of ink drop in response to the error information.

By so doing, graininess and the like can be improved while at the same time compensating error in ink quantity, making it possible to reproduce accurate color.

In a preferred embodiment of the invention, the dot data generator is configured to generate the dot data whose specific dot recording rate is adjusted in response to the error information and a type of print medium.

By so doing, even in instances where the preferred dot recording rate differs for each individual print medium, it is possible to come close to the preferred dot recording rate for each print medium.

The present invention can be realized in various forms such as a method and apparatus for printing, a method and apparatus for producing print data for a printing unit, and a computer program product implementing the above scheme.

BRIEF DESCRIPTION OF THE DRAWINGS

FIG. 11A, FIG. 11B and FIG. 11C are explanatory diagrams showing relationships of occurrence of banding and dot recording rates for dots of relatively small size.

DESCRIPTION OF THE PREFERRED EMBODIMENTS

Embodiments of the present invention will now be described through embodiments in the following sequence.

Figure 1:
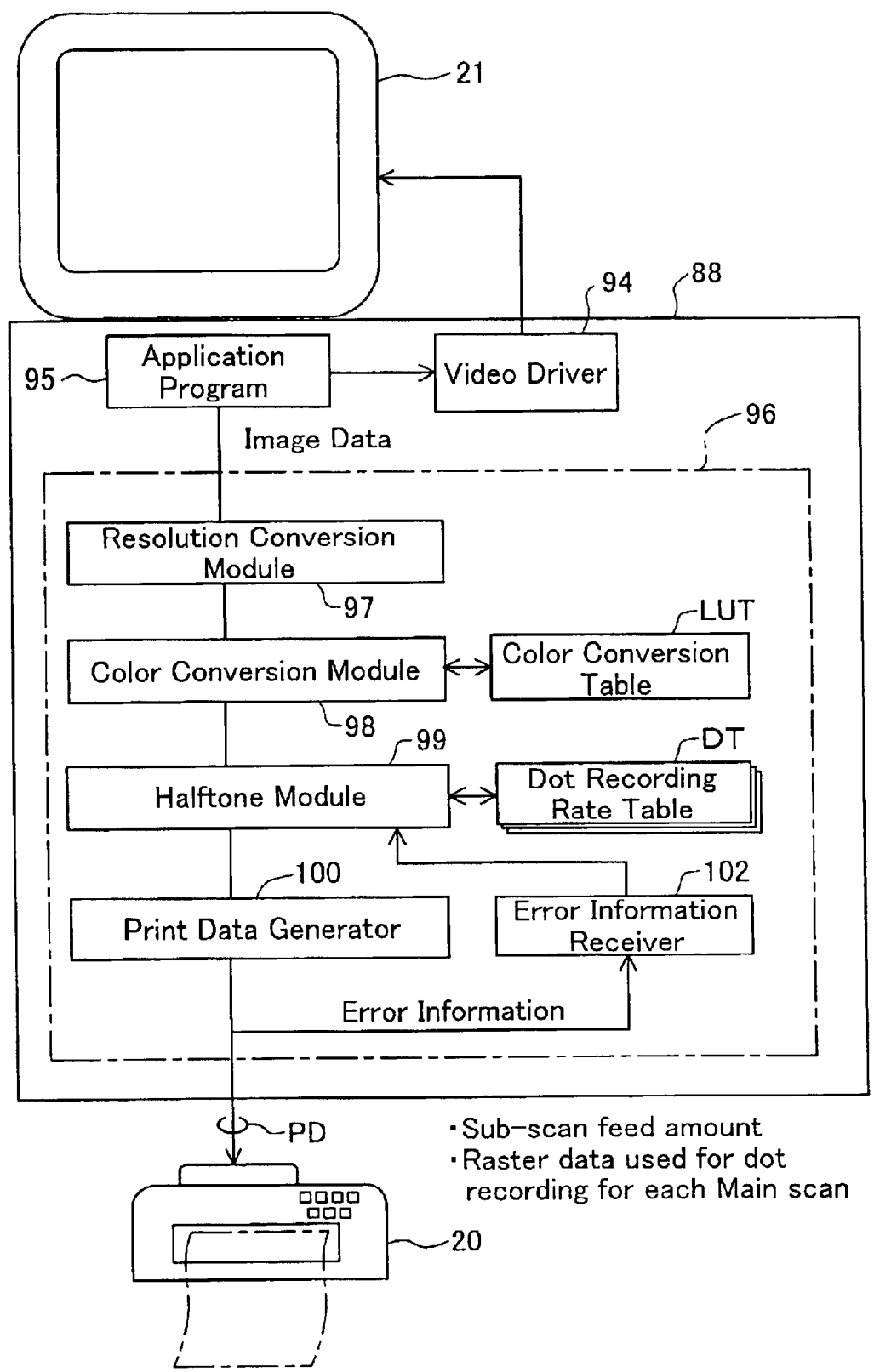
FIG. 1 is a block diagram showing the arrangement of a print system as an embodiment of the present invention.

A. Apparatus Structure:
B. Dot Formation Control Process:
C. Setting of Dot Recording Rate Tables:
D. Adjustment of Dot Recording Rate in the first embodiment:
E. Adjustment of Dot Recording Rate in the second embodiment:
F. Variations:

A. Apparatus Structure:

FIG. 1 is a block diagram that shows the structure of a printing system as an embodiment of the present invention. This printing system has a computer 88 as a printing control apparatus, and a color printer 20 as a printing unit. The combination of color printer 20 and computer 90 can be called a "printing apparatus" in its broad definition.

Application program 95 operates on computer 88 under a specific operating system. Video driver 94 and printer driver 96 are incorporated in the operating system, and print data PD to be sent to color printer 20 is output via these drivers from application program 95. Application program 95 performs the desired processing on the image to be processed, and displays the image on CRT 21 with the aid of video driver 94.

When application program 95 issues a print command, printer driver 96 of computer 88 receives image data from application program 95, and converts this to print data PD to supply to color printer 20. In the embodiment shown in FIG. 1, printer driver 96 includes resolution conversion module 97, color conversion module 98, Halftone module 99, print data generator 100, color conversion table LUT, a plurality of dot recording rate tables DT, and error information receiver 102. The functions performed by these will be described below.

Printer driver 96 is a program for realizing a function that generates print data PD. A program for realizing the functions of printer driver 96 is supplied in a format recorded on a recording medium that can be read by a computer. As this kind of recording medium, any variety of computer readable medium can be used, including floppy disks, CD-ROMs, opt-magnetic disks, IC cards, ROM cartridges, punch cards, printed items on which a code such a bar code is printed, a computer internal memory device (memory such as RAM or ROM), or external memory device, etc.

Figure 2:
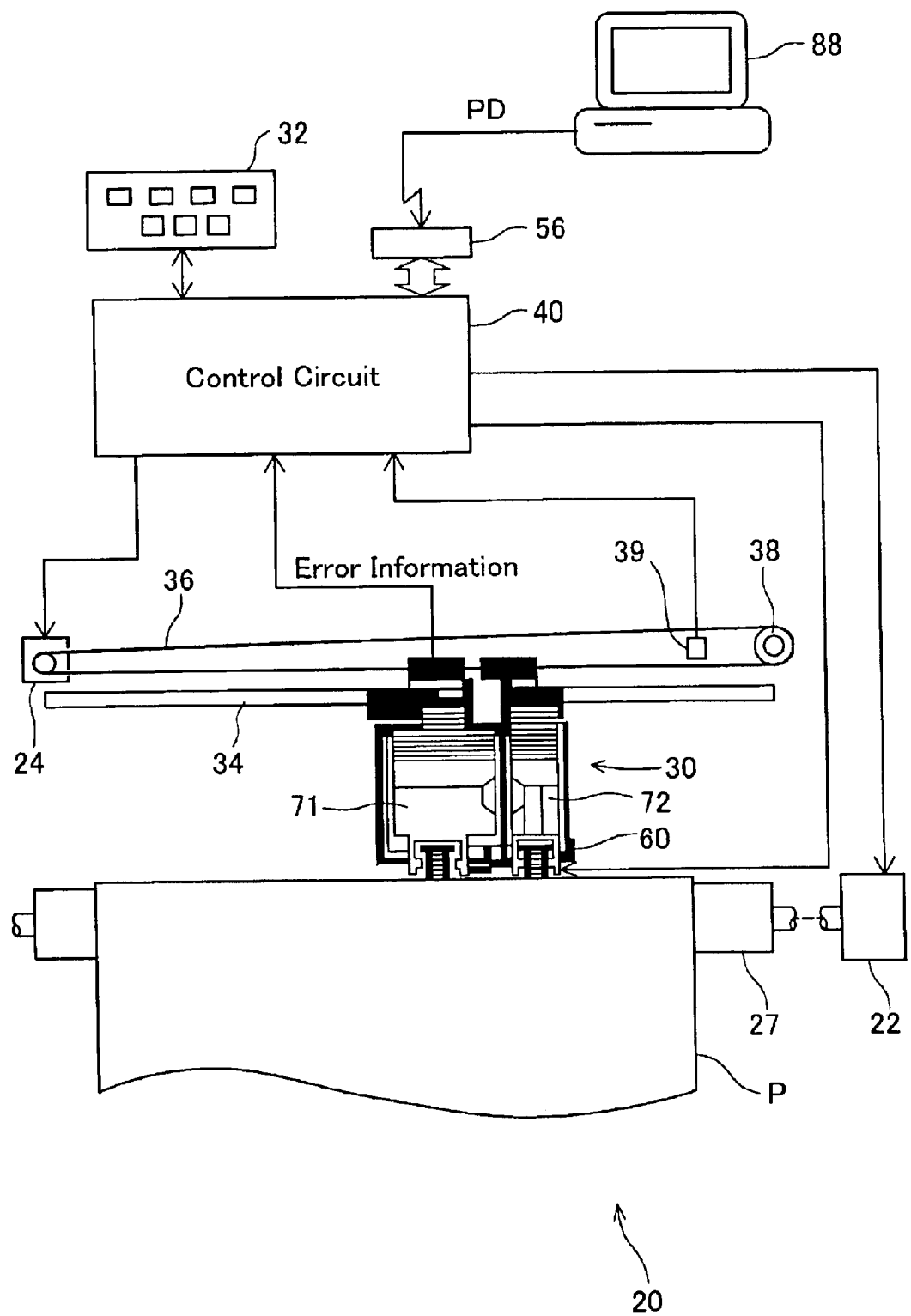
FIG. 2 is a simplified schematic of a color printer 20.

FIG. 2 is a schematic structural diagram of color printer 20. Color printer 20 is equipped with a sub-scan feed mechanism that carries printing paper P in the sub-scanning direction using paper feed motor 22, a main scan feed mechanism that sends cartridge 30 back and forth in the axial direction of platen 26 using carriage motor 24, a head driving mechanism that drives printing head unit 60 built into carriage 30 and controls ink ejecting and dot formation, and control circuit 40 that controls the interaction between the signals of paper feed motor 22, carriage motor 24, printing head unit 60, and operating panel 32. Control circuit 40 is connected to computer 90 via connector 56.

The sub-scan feed mechanism that carries printing paper P is equipped with a gear train (not illustrated) that transmits the rotation of paper feed motor 22 to paper carriage roller (not illustrated). Also, the main scan feed mechanism that sends carriage 30 back and forth is equipped with sliding axis 34 on which is supported carriage 30 so that it can slide on the axis and that is constructed in parallel with the axis of platen 26, pulley 38 on which is stretched seamless drive belt 36 between the pulley and carriage motor 24, and position sensor 39 that detects the starting position of carriage 30.

Print head unit 60 has print head 28, described later, and a memory, not shown, that stores error information indicating error in ink ejection quantity. Control circuit 40 reads out error information from this memory, and transmits it to computer 88 via connector 56. The transmitted error information is received by error information receiver 102 (FIG. 1) in computer 88.

Figure 3:
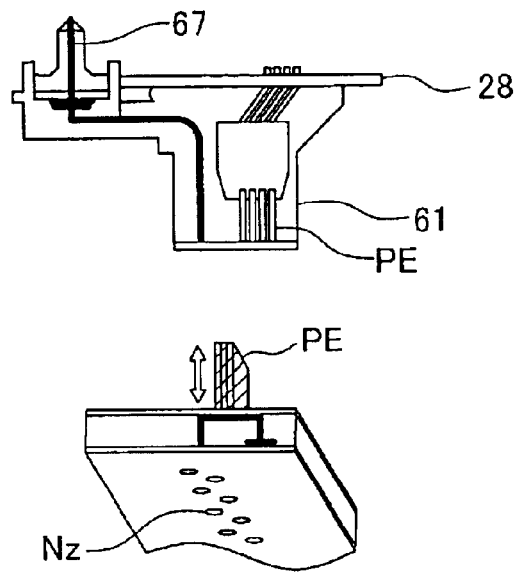
FIG. 3 is an explanatory diagram showing a simplified arrangement of the dot recording head of a printer in an embodiment of the present invention.

FIG. 3 is an explanatory diagram showing a simplified arrangement of the interior of the ink eject head 28. When ink cartridges 71, 72 (FIG. 2) are installed on carriage 30, the ink inside the ink cartridges is drawn out through an introduction line 67 and introduced into heads 61–66 for each color of the print head 28 provided at the bottom of carriage 30.

When an ink cartridge is initially installed, an operation to suction ink into each color head 61–66 is performed by a dedicated pump, but in this embodiment the pump for suctioning, the cap covering the ink head 28 during suctioning, and other such arrangements are neither shown in the drawings nor described.

Figure 4:
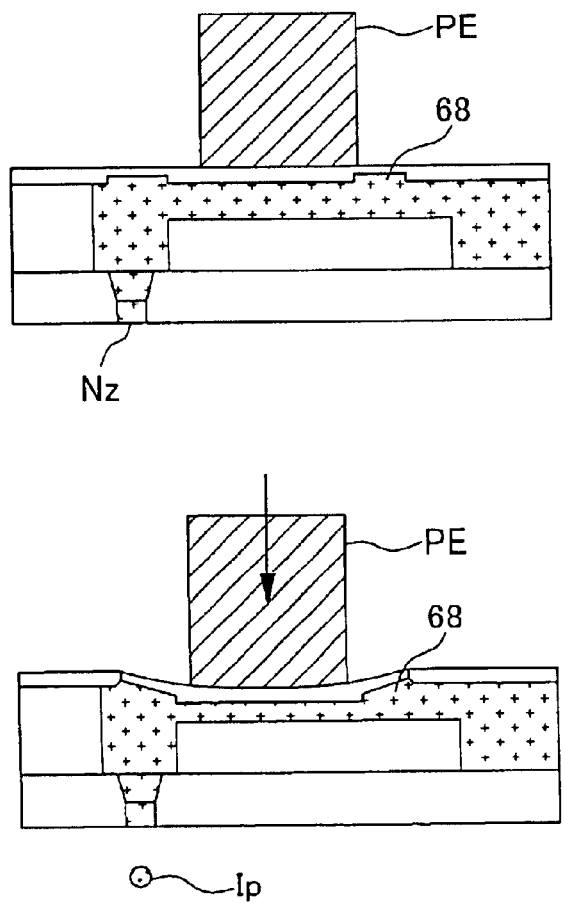
FIG. 4 is an explanatory diagram illustrating the principle of dot formation in a printer in an embodiment of the present invention.

Color heads 61–66 are provided with a plurality of nozzles Nz for each color, and with a piezo element PE, which is one kind of electrostriction device and has excellent response, installed for each nozzle. Details of the structure of a piezo element PE and a nozzle Nz are shown in FIG. 4. As shown in the upper portion of FIG. 4, piezo element PE is disposed at a location contacting ink passage 68 which introduces ink to nozzle Nz. Piezo element PE is an element that undergoes deformation of its crystal structure through application of electrical voltage, and performs electrical-mechanical energy conversion extremely rapidly.

In this embodiment, by applying electrical voltage for a predetermined time interval across electrodes provided to either end of piezo element PE, the piezo element PE expands for the time interval that electrical voltage is applied, and deforms one side wall of ink passage 68 as shown in the bottom portion of FIG. 4. As a result, the volume of ink passage 68 constricts in response to expansion of piezo element PE, and ink corresponding to this volume forms an ink drop Ip, which is ejected at high speed from the tip of nozzle Nz. This ink drop Ip penetrates into the paper P installed on the platen 27 to perform printing. This size of ink drop Ip can be modified by means of the method of applying voltage to piezo element PE. By means of this, it is possible to form, for example, dots of three sizes, namely, large, medium, and small.

The size of ink drop Ip can vary due to manufacturing error of ink passage 68 and individual differences among piezo elements PE as well. The amount of this variation is stored as error information in memory provided to print head unit 60. Error information is information relating to ink drop Ip for forming small dots.

Printer 20 having the hardware arrangement described hereinabove transports paper P by means of paper feed motor 23 (hereinafter termed "subscanning") while reciprocating carriage 30 by means of carriage motor 24 (hereinafter termed "main scanning"), and at the same time driving the piezo elements PE of each color head 61–64 of print head 28 to perform ejection of each color ink, to form dots and produce a multicolor image on paper P.

B. Dot Formation Control Process

Figure 5:
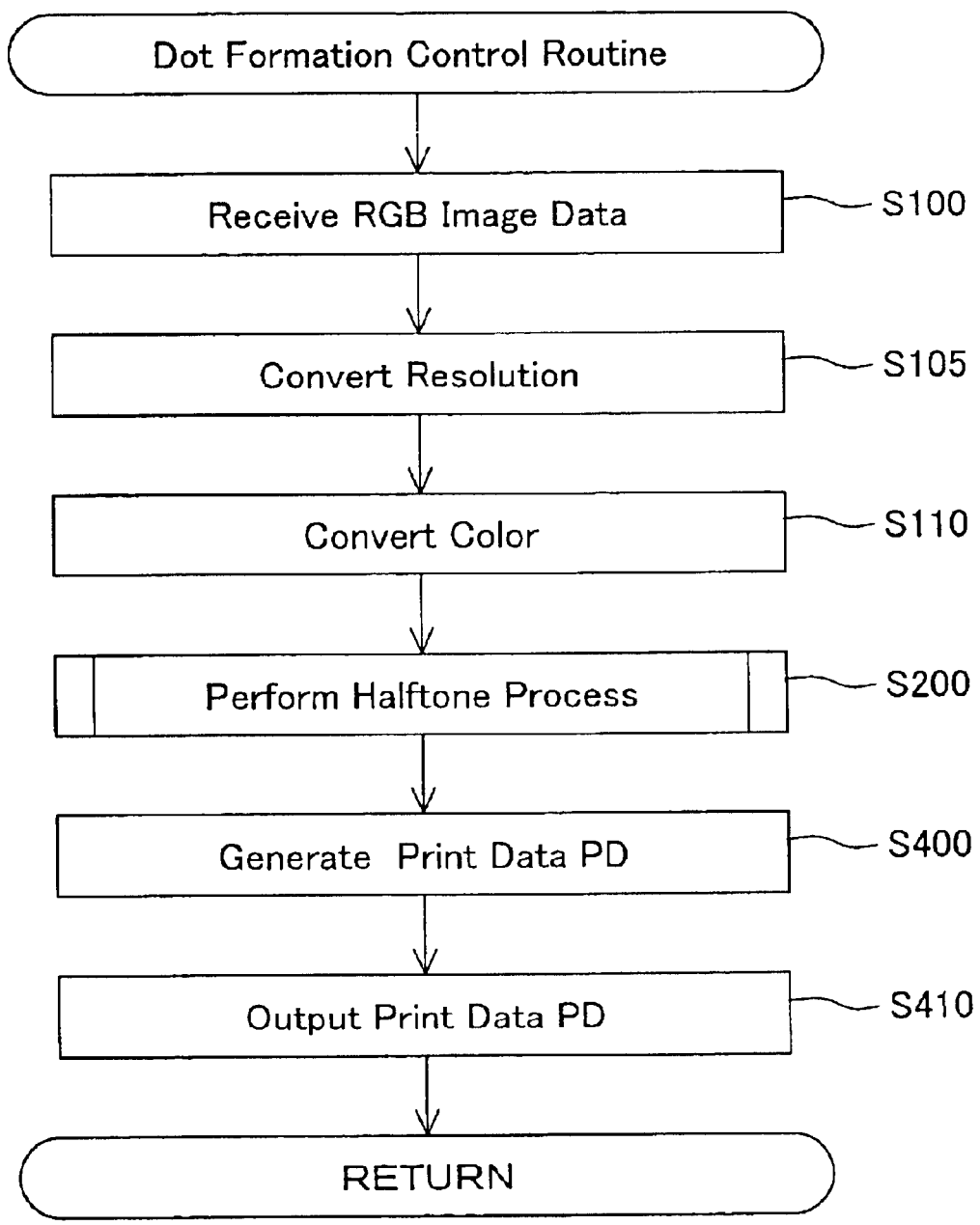
FIG. 5 is a flow chart showing the flow of a dot formation control routine.

FIG. 5 is a flow chart showing the flow of the dot formation control routine in this embodiment. This process is executed in computer 88. In Step S100, printer driver 96 receives RGB image data. This image data is data transferred from application program 95 shown in FIG. 1, and is data having tone values for 256 tones of values 0–255 for each of the colors R, G, B for each pixel that makes up an image.

In Step S105, resolution conversion module 97 converts the resolution of the input image data to the resolution in the printer 20. In the event that image data is lower than the print resolution, resolution conversion is performed by generating new data between adjacent original image data by means of linear interpolation. Conversely, in the event that image data is higher than the print resolution, resolution conversion is performed by thinning out data at a predetermined rate.

In Step S110, color conversion module 98 performs a color conversion process. The color conversion process is a process for converting image data consisting of R, G, B tone values into multi-tone data representing tone values for each of the colors C, M, Y, K used by printer 20. This process is performed using a color conversion table LUT (FIG. 1) which stores C, M, Y, K combinations for representing by means of printer 20 colors consisting of R, G, B combinations.

In Step S200, halftone module 99 performs a halftone process on the image data that has been color converted in this way. Halftone process refers to a decrease process to decrease the number of tone values of the original image data (in this embodiment, 256 tones) to a number of tone values that can represented in each pixel by printer 20. Here, "subtraction" refers to reducing the number of tones representing colors. In this embodiment, a decrease to four tones, namely, "no dot formation", "small dot formation", "medium dot formation", and "large dot formation", is performed.

Figure 6:
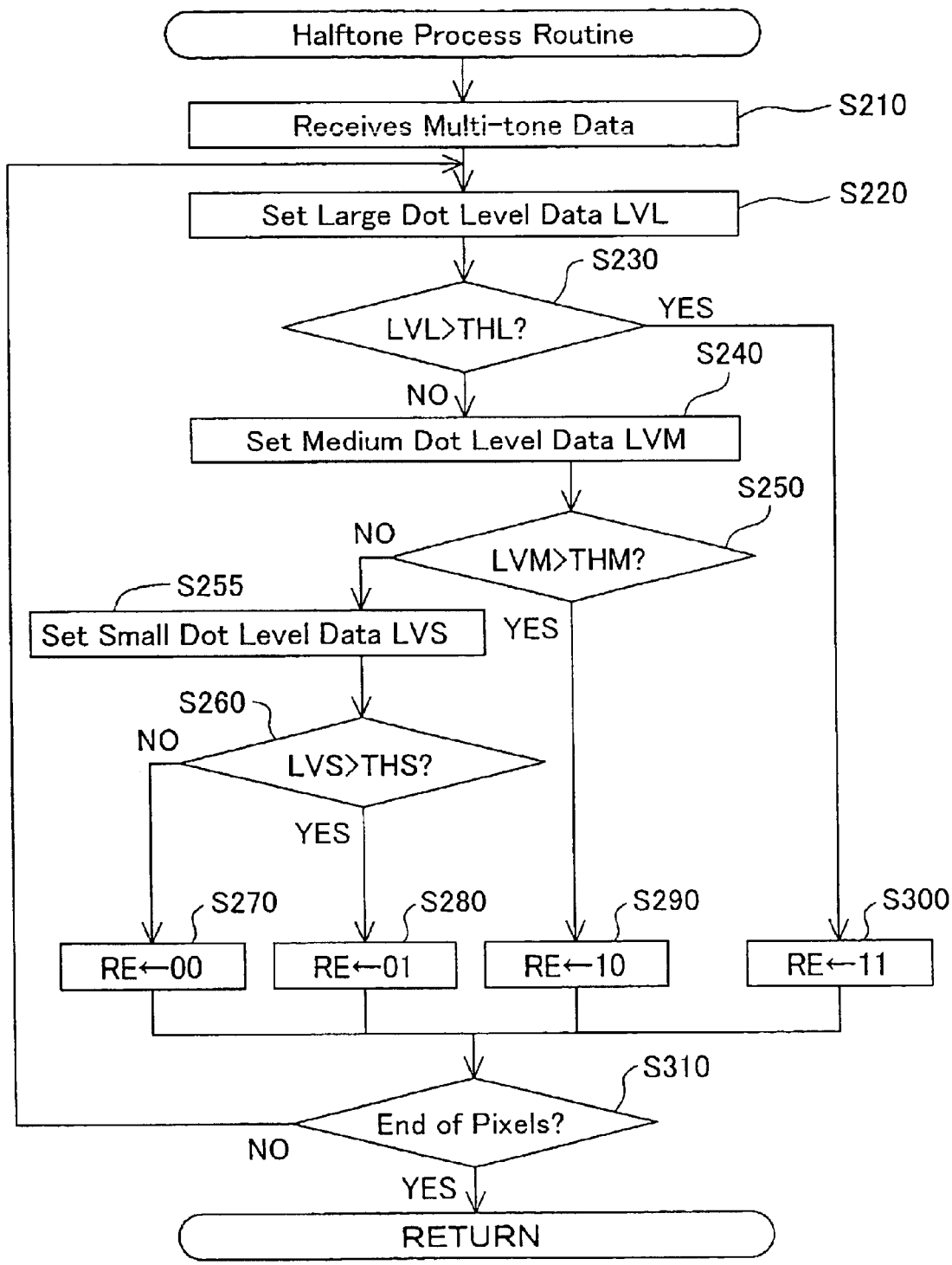
FIG. 6 is a flow chart showing the flow of the halftone process.

FIG. 6 is a flow chart showing the flow of the halftone process in the present embodiment. In Step S210, halftone module 99 receives multi-tone data from color conversion module 98. The multi-tone data input here is data that has been subjected to the color conversion process (Step S110 in FIG. 5) and that has 256 tones for each of the colors C, M, Y, K. In Step S220, large dot level data LVL is determined in the following manner with reference to tones of this image data.

Figure 7:
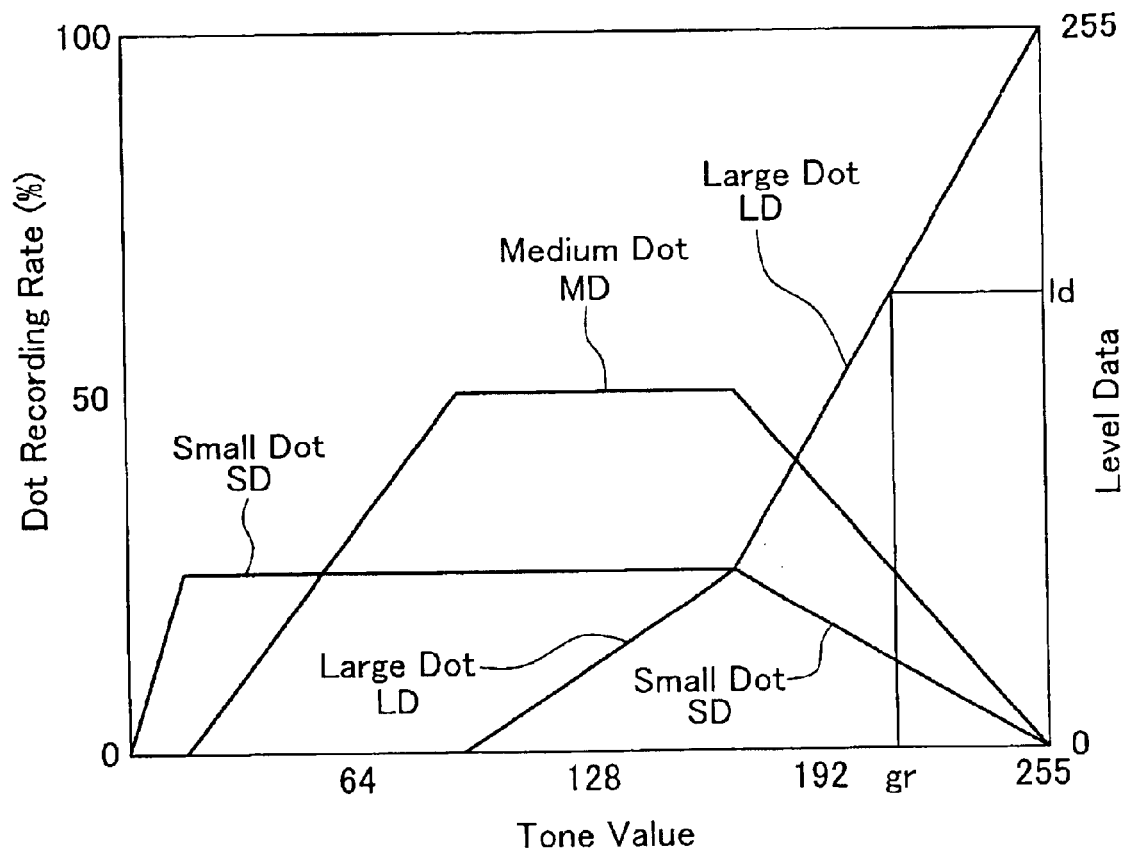
FIG. 7 is an explanatory diagram illustrating a dot recording rate table.

FIG. 7 is an explanatory diagram showing a dot recording rate table used to determine level data for large, medium, and small dots. The horizontal axis in FIG. 7 is tone value (0–255), the left hand vertical axis is dot recording rate (%), and the right hand vertical axis is level data (0–255). Here, for a uniform area reproduced according to a given tone value, "dot recording rate" means the rate of pixels on which dots are formed, among the pixels in that area. Profile SD in FIG. 7 shows the small dot recording rate, profile MD shows the medium dot recording rate, and profile LD shows the large dot recording rate, respectively. Level data refers to data in which dot recording rate has been converted to 256 tones with values of 0–255. The method of setting dot recording rate tables will be described later.

In Step S220, level data LVL corresponding to tone value is read out from the large dot profile LD. For example, as shown in FIG. 7, if tone value of multi-tone data is gr, level data LVL is calculated as Id using profile LD. In actual practice, profile LD is stored in memory as a one-dimensional table, not shown, and level data is calculated making reference to this table. This table is dot recording rate table DT (FIG. 1).

In Step S230, a determination is made as to whether level data LVL set in this way is greater than a threshold value THL. Here, dot ON/OFF determination is performed by means of a dither method, for example. Threshold values THL are different for each pixel, and set using a so-called dither matrix. In this example, a matrix representing values of 0–254 in a 16×16 square pixel block is used.

Figures 8, 9:
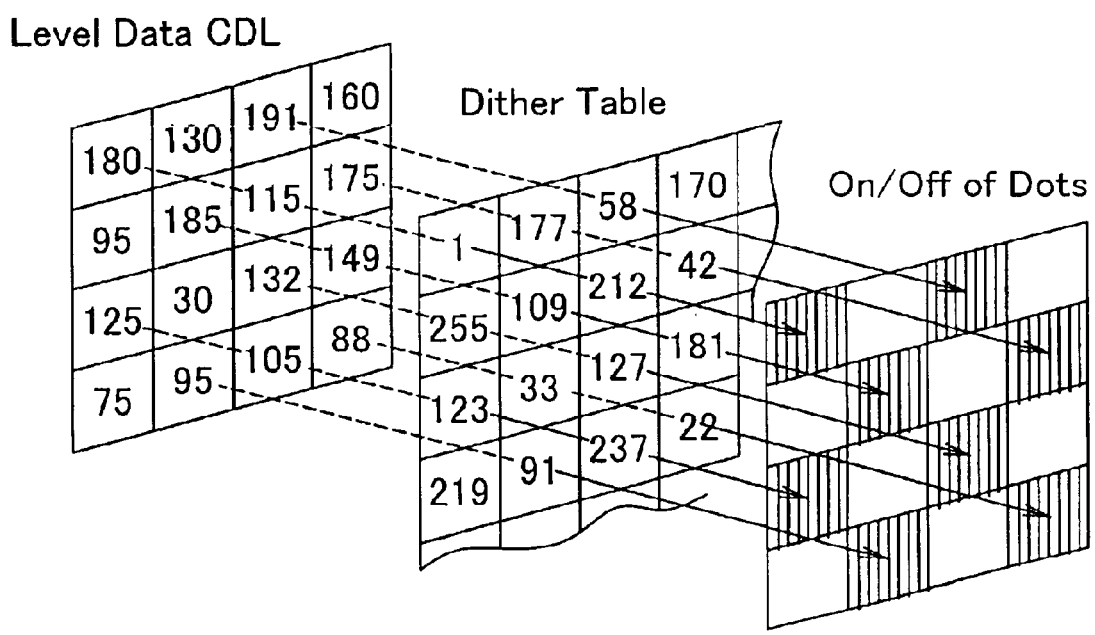
FIG. 8 is an explanatory diagram showing the concept of dot ON/OFF determination by a dither method.
FIG. 9 is an explanatory diagram showing the relationship of a dither matrix used in large dot determination and a dither matrix used in medium dot determination.

FIG. 8 is an explanatory diagram showing the concept of dot ON/OFF determination by a dither method. For convenience in illustration, only a portion of the pixels are shown. As shown in FIG. 8, each pixel of level data LVL is compared with magnitude of the corresponding location in the dither table. Where level data LVL is greater than the threshold value THL indicated in the dither table, the dot is made on, and where level data LVL is smaller, the dot is made OFF. Pixels shown hatched in FIG. 8 means pixels in which dots are made on.

Where level data LVL is greater than threshold value THL, halftone module 99 determines that a large dot should be made on, and substitutes a variable RE indicating the result value with a binary value 11 (Step S300). Result value RE is a variable representing the size of the dot to be formed on a pixel. Where this variable is 11, a large dot will be formed.

On the other hand, in Step S230, if level data LVL is smaller than threshold value THL, halftone module 99 determines that a large dot should not be formed, and proceeds to Step S240. In Step S240, medium dot level data LVM is set. Medium dot level data LVM is set on the basis of tone value, by means of the recording rate table DT described previously. The setting method is the same as for setting the large dot level data LVL.

In Step S250, the relative magnitude of medium dot level data LVM and threshold value THM are compared, and medium dot ON/OFF determination is performed. The method of ON/OFF determination is the same as in the case of large dots, but the threshold value LVM used for the determination is a different value from the threshold value LVL in the case of large dots, as indicated below.

Where ON/OFF determination for both large dots and medium dots is performed using the same dither matrix, pixels in which dots easily go on coincide between the two. That is, when a large dot goes OFF, there is a high probability that a medium dot will go OFF as well. As a result, there is a possibility that medium dot recording rate will be lower than the desired recording rate. In this embodiment, in order to avoid such a phenomenon, the dither matrix is changed between the two. That is, by changing locations of pixels that easily go on between large dots and medium dots, appropriate formation in each is assured.

FIG. 9 is an explanatory diagram showing the relationship of a dither matrix used in large dot determination and a dither matrix used in medium dot determination. In this embodiment, as shown in the drawing, a first dither matrix TM is used for large dots, and a second dither matrix UM, in which threshold values have been shifted symmetrically in the sub-scanning direction, is used for medium dots. In this embodiment, as mentioned previously, 64×64 matrices are used, but for convenience in illustration only 4×4 matrices are shown in FIG. 9. Dither matrices that are completely different from each other may be used for large dots and medium dots.

In Step S250, in the event that level data LVM of a medium dot is greater than threshold value THM, a determination is made that a medium dot should go on, and a binary value 10 is substituted in result value RE (Step S290). On the other hand, in Step S250 if level data LVM of a medium dot is smaller than threshold value THM, a determination is made that a medium dot should not be formed, and proceeds to Step S255.

In Step S255, small dot level data LVS is set in the same manner as setting of level data for large dots and medium dots. In Step S260, halftone module 99, in the event that level data LVS is greater than threshold value THS, makes a determination that a small dot should go on, and substitutes a binary value 01 in result value RE (Step S280). On the other hand, in Step S260, if level data LVS of a small dot is smaller than threshold value THS, a determination that no dot should be formed is made, and a binary value 00 is substituted in result value RE (Step S270). In preferred practice, the small dot dither matrix should be different from those for medium dots and large dots, in order to suppress the reduction in small dot recording rate mentioned earlier.

By means of the above process, a determination is made as to which dot to form in a single pixel. Halftone module 99 repeats the process of Steps S220–S300 until processing has been completed for all pixels (Step S310). Once processing for all pixels has been completed, the halftone process routine is concluded for the time being, and the process returns to the dot formation control process routine. Halftone data corresponds to the "dot data" in the claims.

In Step S400, print data generating module 100 performs generation of print data PD from halftone data generated in this manner. Print data PD is data that includes raster data indicating dot recording status during each main scan, and data indicating sub-scan feed distance, and is output to printer 20 (S410). Printer 20 receives this data and forms large, medium, and small dots on pixels to print an image.

C. Setting of Dot Recording Rate Tables

Figure 10A:
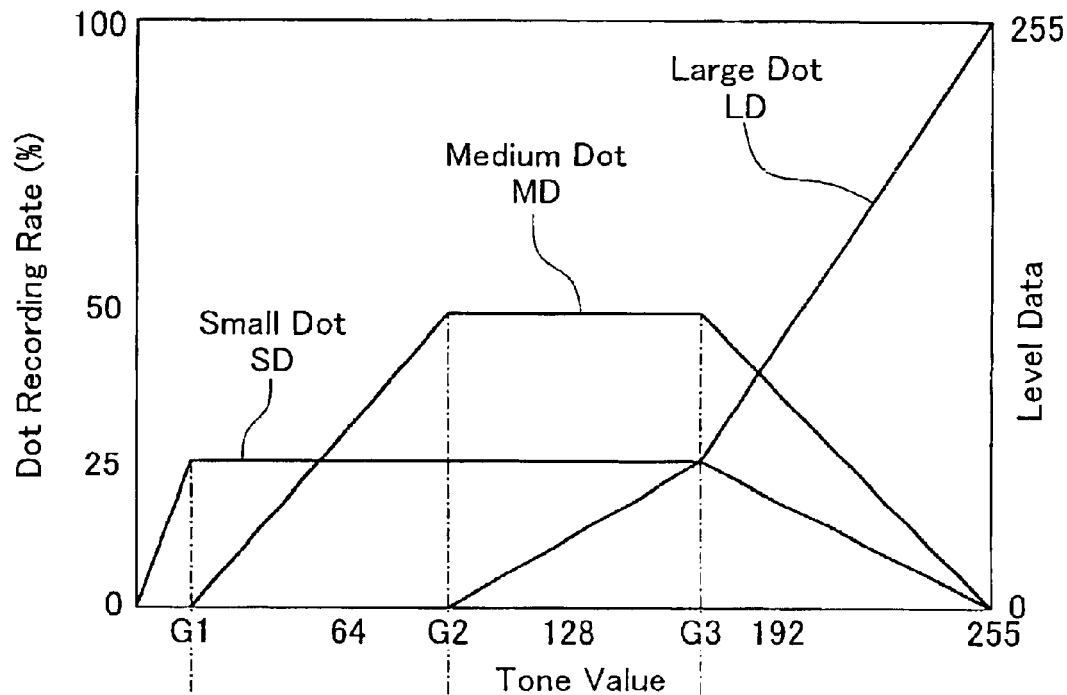
FIG. 10A and FIG. 10B are explanatory diagrams showing relationships of dot recording rate tables and ink ejection amount.
Figure 10B:
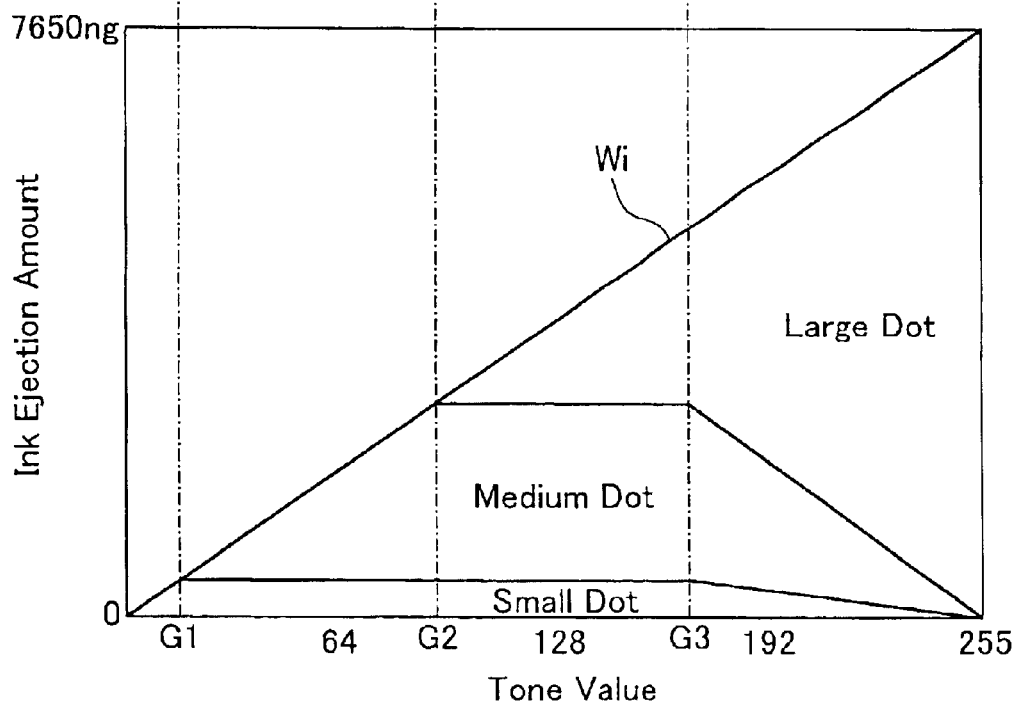

FIG. 10A and FIG. 10B are explanatory diagrams showing relationships of dot recording rate tables and ink ejection amount. FIG. 10A is an explanatory diagram showing a relationship between gray scale values of multi-tone data, and dot recording rates for dots of each size, and is the same as FIG. 7. FIG. 10B is an explanatory diagram showing a relationship between gray scale values and ink weight ejected onto a predetermined area. The predetermined area is a hypothetical area composed of 255 pixels. Ink weight is assumed to be 10 ng for a small dot, 20 ng for a medium dot, and 30 ng for a large dot.

FIG. 10B plots the product of the following for each tone.
(1) dot recording rate for dots of each size (for example, in tone G2, small dots are 25% and medium dots are 50%)
(2) ink weight (10 ng for a small dot, 20 ng for a medium dot, 30 ng for a large dot)
(3) number of pixels in predetermined area (255 pixels)

For example, where tone value is 255 (maximum tone value), the aforementioned product is 7650 ng (=100%×30 ng×255 pixels).

As will be apparent from FIG. 10B, as tone value increases from 0 to 255, ink ejection quantity increases from 0 ng to 7650 ng along line Wi. In this way, in the present embodiment, the ink weight ejected onto a predetermined area and tone values are shown to have a linear relationship, in order to facilitate understanding.

As will be apparent from FIG. 10A and FIG. 10B, ink weight ejected onto a predetermined area increases in the following manner depending on an increase in tone value.
(1) In an range of tone value 0 to tone value G1, ink weight increases in linear fashion with an increase in the dot recording rate of small dots.
(2) In an range of tone value G1 to tone value G2, dot recording rate of small dots is constant, and ink weight increases in linear fashion with an increase in the dot recording rate of medium dots.
(3) In an range of tone value G2 to tone value G3, dot recording rates of small dots and medium dots are constant, and ink weight increases in linear fashion with an increase in the dot recording rate of large dots.
(4) In an range of tone value G3 to maximum tone value, dot recording rates of small dots and medium dots shift into decline, and ink weight increases in linear fashion by means of substituting large dots for small dots and medium dots.

In the present embodiment, such a dot recording rate profile is created as a result of trade-offs such as the following.
(1) In order to minimize graininess (deviation of image), it is preferable that the dot recording rate of relatively large dots—which are readily visible—be low, and the dot recording rate of relatively small dots be high. This characteristic is particularly noticeable in low tone regions.
(2) In order to reduce banding (band-like image degradation), it is preferable that the dot recording rate of relatively small dots be lowered by substituting relatively large dots for relatively small dots. This characteristic is particularly noticeable in high tone regions.

As a result of such a trade-off, in the present embodiment, there is set a profile having an upper limit for dot recording rate of small dots of 25%, and an upper limit for dot recording rate of medium dots of 50%.

FIG. 11A, FIG. 11B, and FIG. 11C are explanatory diagrams showing relationships of occurrence of banding and dot recording rates for dots of relatively small size. Numbers inside the circles indicate ordinal numbers of nozzles that form dots on the corresponding pixel positions. In this example, dots formed by nozzle #5 are producing banding, due to being shifted upwardly as a result of manufacturing error and so forth. As will be apparent from FIG. 11A, where the small dot recording rate is 100%, the fact the banding is occurring will be clearly apparent. As shown in FIG. 11B, it will be apparent that such banding is occurring even where the dot recording rate has declined somewhat.

FIG. 11C is a condition in which a given amount of ink has been ejected onto the same area as in FIG. 11B. Thus, the dot pattern of FIG. 11C and the dot pattern on FIG. 11B represent the same tone. In FIG. 11C, however, 6 of the small dots in FIG. 11B have been replaced with 3 medium dots.

It will be apparent that with the dot pattern of FIG. 11C, banding has been reduced relative to FIG. 11B. This is because the white band occurring in FIG. 11B is due to division of two medium dots produced by nozzle #4 and nozzle #5 [respectively]. It will be apparent that with division of the kind indicated hereinbelow, white banding does not readily becomes noticeable as image degradation.

Figure 12:
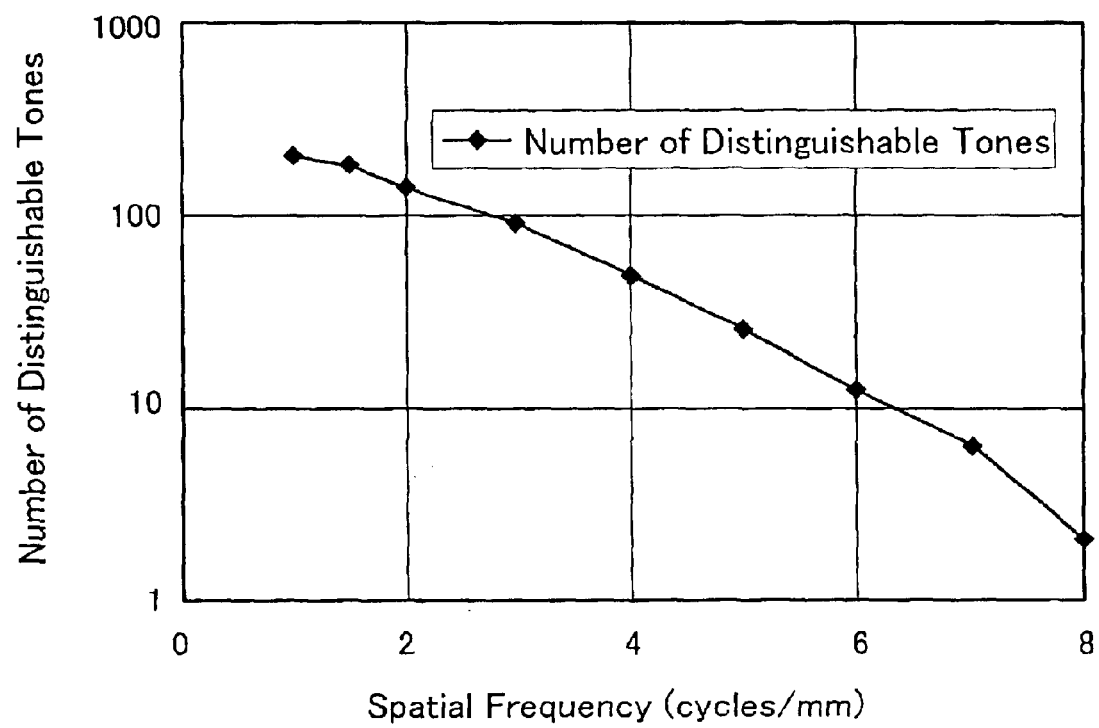
FIG. 12 is a graph showing the relationship of discernible number of tones and space frequency in human visual characteristics.

FIG. 12 is a graph showing shows the relationship between the spatial frequency for human visual characteristics and the number of distinguishable tone. This graph shows that an increase in space frequency is associated with a decline in the number of tones distinguishable to human beings.

For example, if it is assumed that print resolution in the main scanning direction is 720 dpi, the space frequency for pixels is 28 cycles/mm (=720 dpi÷25.4 mm). If a white band of length equivalent to 10 pixels in the main scanning direction occurs, the white band produced will correspond to 2.8 cycles/mm in space frequency. This white band will occur in an range of about 100 tones distinguishable to human visual characteristics. It will be apparent that as a result, image degradation due to the white band will be readily noticeable to humans as banding.

If, on the other hand, a white band is interrupted as shown in FIG. 11C, it will be substantially indiscernible to the human eye. This is because if the length of the white band resulting from division is, for example, length equivalent to 3 pixels, it will exceed 9 cycles/mm in space frequency, image degradation that is in an area substantially unnoticeable to the human eye.

In this way, it should be apparent that if small dot recording rate is increased alone, or small dot recording rate is increased while the medium dot recording rate is very low, banding will tend to occur. If large numbers of medium dots are employed, conversely, graininess (deviation of image) tends to occur. Medium dots are more readily discernible than small dots.

Thus, recording rates for dots of each size are set to optimal values as a result of the trade-off between banding and graininess described previously. Incidentally, if dot size fluctuates due to error, the problem of values intended to be set to optimal levels no longer being optimal will occur. This problem is solved in the following embodiments.

D. Adjustment of Dot Recording Rate in the First Embodiment

Figures 13A, 13B:
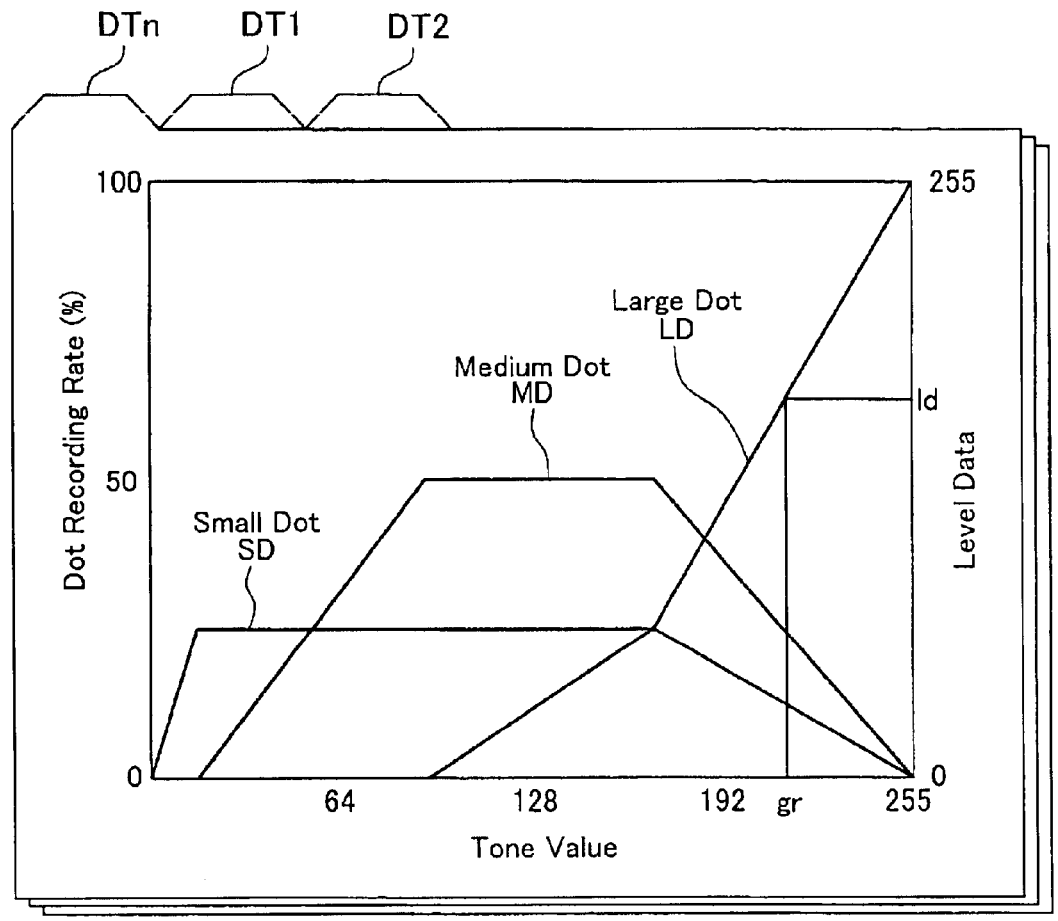
FIG. 13A and FIG. 13B are explanatory diagrams showing a plurality of dot recording rate tables utilized in the first embodiment of the present invention.

FIG. 13A and FIG. 13B are explanatory diagrams showing a plurality of dot recording rate tables DT(n) utilized in the first embodiment of the present invention. FIG. 13A shows three dot recording rate tables DTn, DT1, DT2 included among a plurality of dot recording rate tables DT(n).

FIG. 13B shows a relationship between error information received by error information receiver 102, and dot recording rate tables DTn, DT1, DT2 selected in the subtraction process in response thereto. Where error information is, for example, 0.1, this means that the ink quantity in an ink drop is 10% more than the nominal value. That is, where error information is 0.1, it is estimated that an actually ejected small dot ink drop will be 11 ng.

In the present embodiment, dot recording rate table DTn is selected when error information is −0.1 to 0.1, dot recording rate table DT1 is selected when error information is greater than 0.1, and dot recording rate table DT2 is selected when error information is less than −0.1.

Figures 14A, 14B:
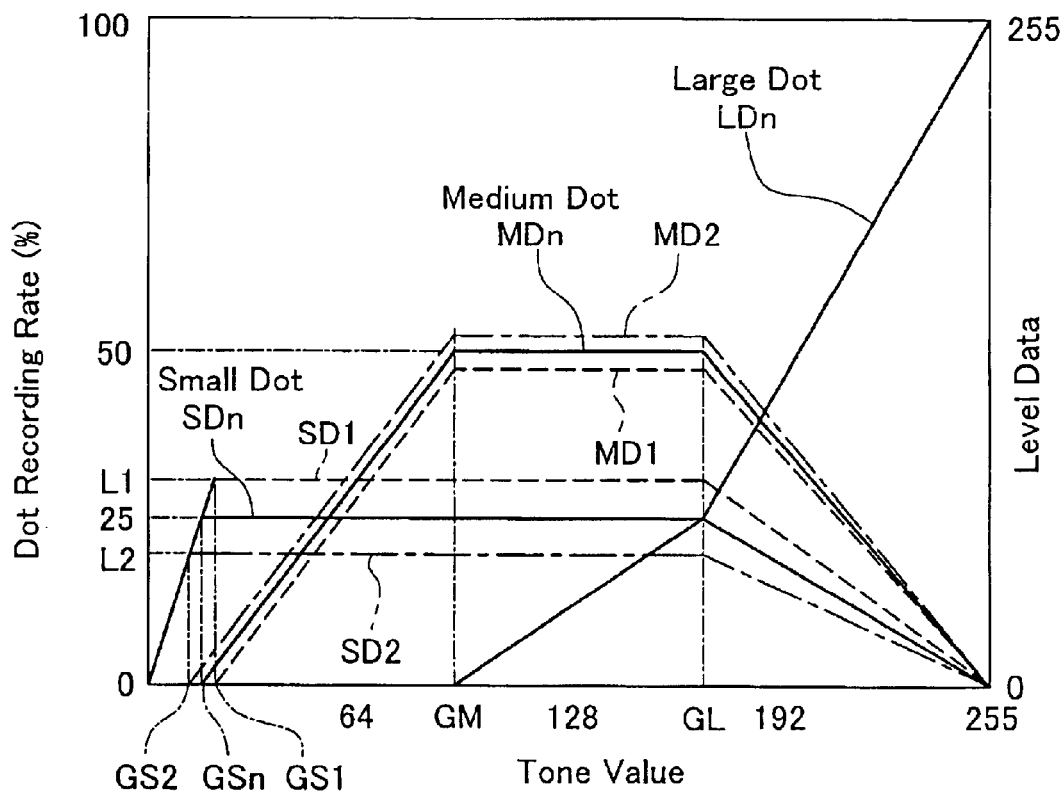
FIG. 14A and FIG. 14B are explanatory diagrams showing a setting method of dot recording rate tables utilized in the first embodiment of the present invention.

FIG. 14A and FIG. 14B are explanatory diagrams showing a setting method of dot recording rate tables utilized in the first embodiment of the present invention. FIG. 14A shows profiles of recording rates of dots of each size used to set dot recording rate table. For example, dot recording rate profile for small dots include profiles SDn, SD1, and SD2. Profile SDn is used as the dot recording rate for small dots when error information is between −0.1 and 0.1; profile SD1 and profile SD2 are used to determine dot recording ratio of small dots when error information is greater than 0.1, and when error information is less than −0.1, respectively.

The difference among these profiles SDn, SD1, and SD2 lies in the upper limit value for dot recording rate. The upper limit value for dot recording rate is set to 25% in profile SDn, whereas in profile SD1 it is 5% higher than in profile SDn, i.e., 30% (L1), and in profile SD2 it is 5% lower than in profile SDn, i.e., 20% (L2).

Adjustment of profile for small dot recording rate is accompanied by adjustment of medium dot recording rate profile MDn, MD1, MD2 as well. For example, where error information is greater than 0.1, profile MD1 is selected as the dot recording rate profile for medium dots. By so doing, when gray scale value reaches GS1 and the small dot recording rate has reached the upper limit value, recording of medium dots commences. The dot recording rate for medium dots declines overall in association with a rise in maximum recording rate for small dots, as will be apparent from profile MD1. As a result, the number of medium dots is reduced and graininess is improved.

The printing process in the present embodiment is carried out as follows. When application program 95 issues a print command, first, computer 88 reads out error information from the memory of print head unit 60 via the control circuit 40 of printer 20. This error information is received by error information receiver 102 in computer 88, and sent to halftone module 99.

Halftone module 99 selected a dot recording rate table DT(n) depending on the error information. By means of this, an optimal dot recording table is selected depending on ink drop error, making possible printing under conditions such that graininess and banding due to error in ink ejection quantity is minimized.

In this way, in the first embodiment, dot recording rate for small dots is adjusted by modifying the upper limit of the small dot recording rate depending on error information, so graininess and banding due to error in ink ejection quantity is reduced. Dot recording rate tables DT1, DT2 correspond to the "tables" in the claims.

E. Adjustment of Dot Recording Rate in the Second Embodiment

Figures 15A, 15B:
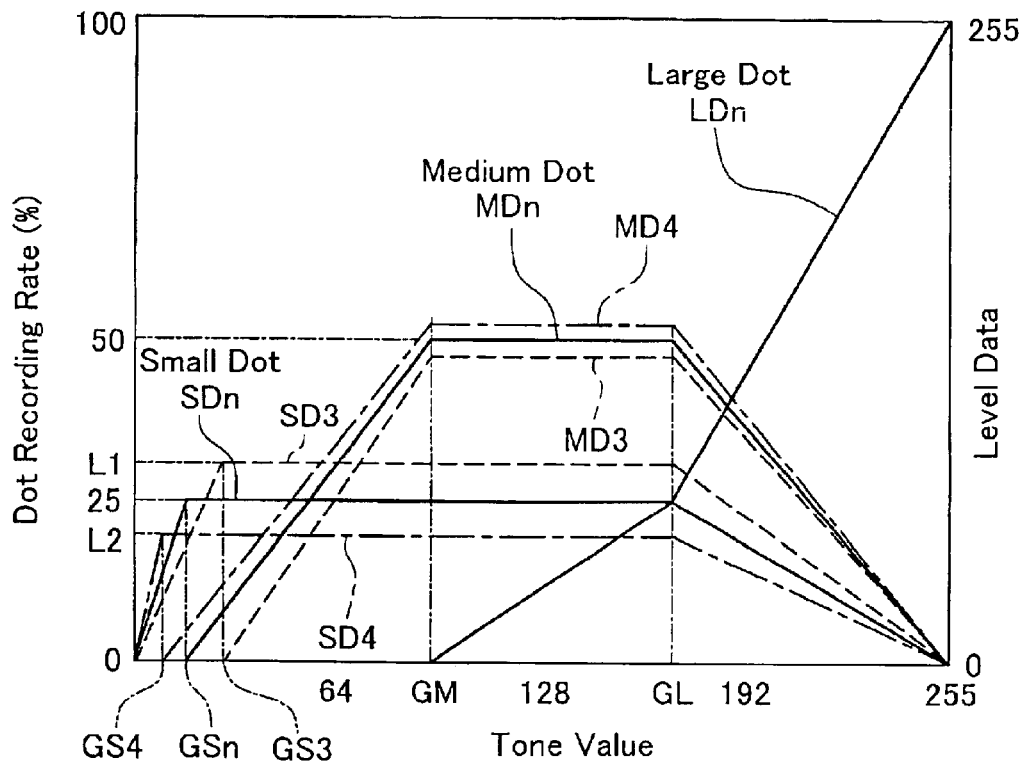
FIG. 15A and FIG. 15B are explanatory diagrams showing a setting method of dot recording rate tables utilized in the second embodiment of the present invention.

FIG. 15A and FIG. 15B are explanatory diagrams showing a setting method of dot recording rate tables utilized in the second embodiment of the present invention. In the second embodiment, not only are graininess and banding due to error in ink ejection quantity minimized, but error in ink quantity ejected onto a print medium is compensated so that accurate color is reproduced.

In the present embodiment, dot recording profiles for small dots include profiles SDn, SD3, and SD4 (FIG. 15A). Profile SDn is the same as profile SDn shown in FIG. 14A; profile SD3 and profile SD4 are profiles used as dot recording rate when error information is greater than 0.1 and error information is less than −0.1, respectively.

Profile SD3 is similar to profile SD1 in that it is used when error information is greater than 0.1, and in that the upper limit of dot recording rate is increased to 30%. However, profile SD3 is different in that the slope of the profile is smaller than that of profile SD1 in the area wherein tone is represented by small dots only (the area of tone values 0-GS3).

The reason for making the slope smaller is that it is the profile used when small dots become large due to error, and so recording rate at each tone value is reduced in order to compensate for the ink amount error ejected on the print medium. On the other hand, profile SD4, which is used when error information is less than −0.1, conversely has greater slope in order to increase the dot recording rate and compensate ink quantity.

In this way, in the second embodiment offers the advantage that not only are graininess and banding due to error in ink quantity minimized depending on error information, but error in ink quantity ejected onto a print medium can be compensated as well.

"Compensated for the ink amount error of the specific type of ink drop" in the claims refers to adjusting the weight of ink ejected in a predetermined area so as to make it difficult for fluctuations thereof to occur due to error in ink quantity of specific type of ink drops.

F. Variations

This invention is not limited to the examples and embodiments described hereinabove, and can be worked in various modes without departing from the spirit thereof; for example, variations such as the following are possible as well.

F-1. In the embodiments hereinabove, one of three dot recording rate tables is selected depending on error information, but the number of dot recording tables available for selection may instead be two, or four or more.

F-2. In the embodiments hereinabove, the upper limit for the recording rate of the smallest of the three kinds of dots is varied depending on error information, but in printing devices capable of producing four kinds of dots, the upper limit for the recording rate of the second smallest dots could be varied instead. Typically, the specific type of ink drops whose upper limit for recording rate is adjusted in the present invention will be relatively smaller dots from among several types of dots that can be formed.

F-3. In the embodiments hereinabove, the upper limit of dot recording rate is modified only for ink drops that form small dots depending on error information, but other types of ink drops could be modified at the same time. For example, the upper limit for the dot recording rate of medium dots could be modified as well. The present invention is generally applicable in cases where the problems of banding and graininess occur as a result of error in ink quantity of at least one kind of specific type of ink drop among several types of ink drops that can be ejected by a printing device.

F-4. In the embodiments hereinabove, dot recording rate is adjusted depending on error information only, but could instead be adjusted depending on both error information and type of print medium. Even where the preferred dot recording rate differs by print medium, an ideal dot recording rate for each print medium can be approximated.

F-5. In the embodiments hereinabove, a method of a dither (diffusion) process is used for the halftone process, but an error diffusion process could also be used. In general, the method of the halftone process can be any one that can reduce multilevel data of each ink color to a number of tone levels possible to form by means of N types of dots.

F-6. In the embodiments hereinabove, a printer equipped with a head that uses piezo elements to eject ink is used, but a printer that ejects ink by another method could be used. For example, it is applicable to a printer of a type wherein current is passed through a heater arranged on the ink passage, and ink is ejected by means of bubbles generated within the ink passage.

Processes in the printing device described hereinabove can also be realized by means of a computer program. As storage media having such a computer program recorded thereon, there may be employed flexible disks, CD-ROM, magnetooptical disks, IC cards, ROM cartridges, punch cards, printed matter imprinted with bar codes or other symbols, computer internal memory devices (RAM, ROM, and other memory) and external memory devices, and other such computer-readable media. A mode of a program supplying device that supplies computer program for performing image processing and the like described hereinabove on a computer via a communications path is also possible.

What is claimed is:

1. A printing apparatus capable of fanning one of N types of dots having different sizes at one pixel area by a selective ejection of any of the N types of ink drops onto a print medium, the N types of ink drops being different in an ink amount, N being an integer of at least 2, the apparatus comprising an error information receiver configured to receive error information indicative of an ink amount error of at least one specific type of ink drop among the N types of ink drops;

a dot data generator configured to process input image data for generating dot data representing a state of dot formation at each pixel in a printed image; and a dot recorder configured to eject the N types of ink drops onto the print medium in response to the dot data;

wherein the dot data generator is configured to generate the dot data whose specific dot recording rate is adjusted in response to the error information, the specific dot recording rate being a rate of dot recorded with the specific type of ink drops.

2. The printing apparatus in accordance with claim 1, wherein the specific type of ink drop is an ink drop to record a relatively small dot among the N types of ink dots; and the dot data generator is configured to generate the dot data whose upper limit of the specific dot recording rate is modified.

3. The printing apparatus in accordance with claim 2, wherein the dot data generator is configured to raise the upper limit of the specific dot recording rate when the error information shows increase of the ink amount by the ink amount error.

4. The printing apparatus in accordance with claim 2, wherein the dot data generator is configured to lower the upper limit of the specific dot recording rate when the error information indicates decrease of the ink amount by the ink amount error.

5. The printing apparatus in accordance with claim 1, wherein the specific type of ink drop has a lowest ink amount among the N types of ink drops.

6. The printing apparatus in accordance with claim 1, wherein the dot data generator comprises:

a dot recording rate table storage configured to storage a plurality of dot recording rate tables for determination of the N types of ink dots; and a dot recording rate table selector configured to select one of the plurality of dot recording rate tables in response to the error information; wherein the plurality of dot recording rate tables includes a specific table to be selected in response to the error information.

7. The printing apparatus in accordance with claim 6, wherein the specific dot recording rate table is further adjusted to compensate for the ink amount error of the specific type of ink drop in response to the error information.

8. The printing apparatus in accordance with claim 1, wherein the dot data generator is configured to generate the dot data compensated for the ink amount error of the specific type of ink drop in response to the error information.

9. The printing apparatus in accordance with claim 1, wherein the dot data generator is configured to generate the dot data whose specific dot recording rate is adjusted in response to the error information and a type of print medium.

10. A printing method capable of forming one of N types of dots having different sizes at one pixel area by a selective ejection of any of the N types of ink drops onto a print medium, the N types of ink drops being different in an ink amount, N being an integer of at least 2, the method comprising the steps of:

(a) receiving error information indicative of an ink amount error of at least one specific type of ink drop among the N types of ink drops;

(b) processing input image data for generating dot data representing a state of dot formation at each pixel in a printed image; and (c) ejecting the N types of ink drops onto the print medium in response to the dot data; wherein the step (b) includes the step of generating the dot data whose specific dot recording rate is adjusted in response to the error information, the specific dot recording rate being a rate of dot recorded with the specific type of ink drops.

11. The method in accordance with claim 10, wherein the specific type of ink drop is an ink drop to record a relatively small dot among the N types of ink dots; and the step (b) includes the step of generating the dot data whose upper limit of the specific dot recording rate is modified.

12. The method in accordance with claim 11, wherein the step (b) includes the step of raising the upper limit of the specific dot recording rate when the error information shows increase of the ink amount by the ink amount error.

13. The method in accordance with claim 11, wherein the step (b) includes the step of lowering the upper limit of the specific dot recording rate when the error information indicates decrease of the ink amount by the ink amount error.

14. The method in accordance with claim 10, wherein the specific type of ink drop has a lowest ink amount among the N types of ink drops.

15. The method in accordance with claim 10, wherein the step (b) includes the step of:

storing a plurality of dot recording rate tables for determination of the N types of ink dots; and selecting one of the plurality of dot recording rate tables in response to the error information; wherein the plurality of dot recording rate tables includes a specific table to be selected in response to the error information.

16. The method in accordance with claim 10, wherein the step (b) includes the step of generating the dot data compensated for the ink amount error of the specific type of ink drop in response to the error information.

17. The method in accordance with claim 16, wherein the specific dot recording rate table is further adjusted to compensate for the ink amount error of the specific type of ink drop in response to the error information.

18. The method in accordance with claim 10, wherein the step (b) includes the step of generating the dot data whose specific dot recording rate is adjusted in response to the error information and a type of print medium.

19. A printing method comprising:

providing a print unit capable of forming one of N types of dots having different sizes at one pixel area by a selective ejection of any of the N types of ink drops onto a print medium, the N types of ink drops being different in an ink amount, N being an integer of at least 2; and adjusting specific dot recording rate in response to error information indicative of an ink amount error of at least one specific type of ink drop among the N types of ink drops, the specific dot recording rate being a rate of dot recorded with the specific type of ink drops.

20. A printing control apparatus for generating print data to be supplied to a print unit capable of forming one of N types of dots having different sizes at one pixel area by a selective ejection of any of the N types of ink drops onto a print medium, the N types of ink drops being different in an ink amount, N being an integer of at least 2, the apparatus comprising:

an error information receiver configured to receive error information indicative of an ink amount error of at least one specific type of ink drop among the N types of ink drops; and a dot data generator configured to process input image data for generating dot data representing a state of dot formation at each pixel in a printed image;

wherein the dot data generator is configured to generate the dot data whose specific dot recording rate is adjusted in response to the error information, the specific dot recording rate being a rate of dot recorded with the specific type of ink drops.

21. A printing control method of generating print data to be supplied to a print unit capable of forming one of N types of dots having different sizes at one pixel area by a selective ejection of any of the N types of ink drops onto a print medium, the N types of ink drops being different in an ink amount, N being an integer of at least 2, the method comprising (a) receiving error information indicative of an ink amount error of at least one specific type of ink drop among the N types of ink drops; and (b) processing input image data for generating dot data representing a state of dot formation at each pixel in a printed image; wherein the step (b) includes the step of generating the dot data whose specific dot recording rate is adjusted in response to the error information, the specific dot recording rate being a rate of dot recorded with the specific type of ink drops.

22. A computer program for causing a computer to generate print data to be supplied to a print unit capable of forming one of N types of dots having different sizes at one pixel area by a selective ejection of any of the N types of ink drops onto a print medium, the N types of ink drops being different in an ink amount, N being an integer of at least 2, the computer program comprising programs for causing the computer to perform:

a receiving function for receiving error information indicative of an ink amount error of at least one specific type of ink drop among the N types of ink drops; and a generating function for processing input image data for generating dot data representing a state of dot formation at each pixel in a printed image;

wherein the generating function includes a function for generating the dot data whose specific dot recording rate is adjusted in response to the error information, the specific dot recording rate being a rate of dot recorded with the specific type of ink drops.

* * * * *